(12) United States Patent
King-Smith et al.

(10) Patent No.: US 6,829,662 B2
(45) Date of Patent: Dec. 7, 2004

(54) DYNAMICALLY OPTIMIZING THE TUNING OF SOCKETS ACROSS INDETERMINATE ENVIRONMENTS

(75) Inventors: Bernard A. King-Smith, Lake Katrine, NY (US); Gary J. Mincher, Rhinebeck, NY (US); Murray J. Richman, Newburgh, NY (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 09/892,810

(22) Filed: Jun. 27, 2001

(65) Prior Publication Data

US 2003/0005187 A1 Jan. 2, 2003

(51) Int. Cl.[7] .................................................. G06F 3/00
(52) U.S. Cl. .............................. 710/56; 710/8; 710/10; 710/15; 710/52; 709/220; 709/223; 709/226; 709/228
(58) Field of Search ............................ 710/8, 10, 15, 710/52, 56; 709/220, 223, 226, 228

(56) References Cited

U.S. PATENT DOCUMENTS

| | | | |
|---|---|---|---|
| 4,453,247 A | | 6/1984 | Suzuki et al. .................. 370/94 |
| 4,905,230 A | | 2/1990 | Madge et al. ............... 370/85.5 |
| 5,179,662 A | | 1/1993 | Corrigan et al. ............ 395/250 |
| 5,628,005 A | | 5/1997 | Hurvig ........................ 395/608 |
| 5,892,980 A | | 4/1999 | Tal et al. ..................... 395/876 |
| 5,978,802 A | | 11/1999 | Hurvig ............................ 707/8 |
| 6,163,797 A | * | 12/2000 | Eckley et al. ................ 709/203 |
| 6,304,967 B1 | * | 10/2001 | Braddy ........................ 713/150 |
| 6,336,152 B1 | * | 1/2002 | Richman et al. ................ 710/8 |
| 6,405,252 B1 | * | 6/2002 | Gupta et al. ................. 709/224 |
| 6,539,427 B1 | * | 3/2003 | Natarajan et al. ........... 709/224 |

OTHER PUBLICATIONS

"Automatic TCP Buffer Tuning", J. Semke, J. Mahdavi, M. Mathis, Pittsburgh Supercomputing Center, XP–000914445, Pub. Date 10/98, pp. 315–323.
"Automatic TCP Window Tuning and Applications", XP–002218780, Pub. Date Jan. 6, 2001, pp. 1–7.
"UDP, TCP/IP and mbuf Tuning Parameters Summary", XP–002218781, Pub. Date Jun. 3, 2001, pp. 1–6.
"Auto Tuning Enabled FTP Client and Server", XP–002218782, Apr. 30, 2001, pp. 1–4.
"Interaction Between PCM Parameters And Communication Performances On ATM Networks", Giordano, M.; Furnari, M.M. Vitobello, F.; Parallel Computation—4th International ACPC Conference, Feb. 16–18, 1999, pp. 586–587 (Abstract only).
"Enabling High Performance Data Transfers On Hosts", http://www.psc.edu/networking/perf_tune.html.
"Design For A Simple Network Management Protocol Subagent For Internet Firewalls", IBM Technical Disclosure Bulletin, vol. 40, No. 03, Mar. 1997, pp. 63–68.
"System Tuning And Performance Management", http://www.rcnp.ssaka–u.ac.jp/unix/DOCUMENTATION/HTML/AA–Q0R3E–TET1_html/tune2.html.

* cited by examiner

Primary Examiner—Jeffrey Gaffin
Assistant Examiner—Eron J Sorrell
(74) Attorney, Agent, or Firm—Lawrence D. Cutter, Esq.; Blanche E. Schiller, Esq.; Heslin Rothenberg Farley & Mesiti P.C.

(57) ABSTRACT

Sockets of a computing environment are optimally tuned, even though the environment is dynamic. The tuning is based on information dynamically determined at the time a socket is opened. The information includes, for instance, application specific information and/or socket specific information. Based on the information, one or more parameters of the socket, such as a socket send buffer size and/or a socket receive buffer size, are set to reflect the current configuration of the environment.

59 Claims, 4 Drawing Sheets

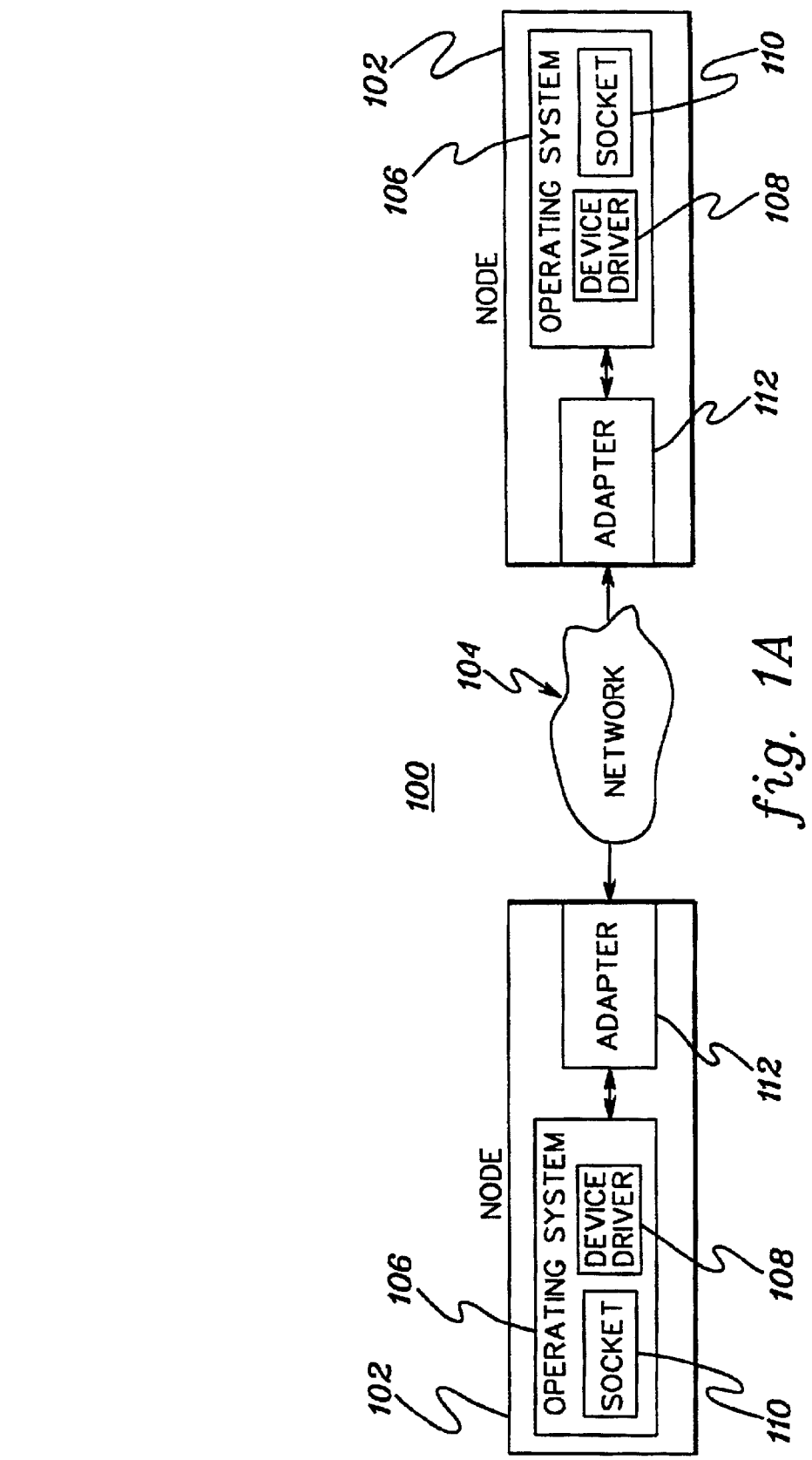

US 6,829,662 B2

DYNAMICALLY OPTIMIZING THE TUNING OF SOCKETS ACROSS INDETERMINATE ENVIRONMENTS

TECHNICAL FIELD

This invention relates, in general, to optimizing system resources, and in particular, to dynamically tuning sockets across an indeterminate number of socket connections and unknown network types.

BACKGROUND OF THE INVENTION

In computing environments that can be dynamically changed, such as in parallel and cluster environments, optimal tuning of system resources is a challenge and tedious task. In particular, it is very difficult to tune the system resources for optimal performance when, for instance, the number of nodes and thus, the number of sockets, is variable, or when the type of network is unknown.

Thus, previously, a single set of resources has been tuned and shared across several applications. Alternatively, parameters of the resources have been adjusted with severe impact to the system. That is, the system would be stopped, adjustments would be made, and then the system would be started again, thus impacting other applications on the system.

Based on the foregoing, a need still exists for a capability that enables system resources to be optimally set for dynamic computing environments. For example, a need exists for a capability that enables the tuning of socket parameters for indeterminate environments.

SUMMARY OF THE INVENTION

The shortcomings of the prior art are overcome and additional advantages are provided through the provision of a method of tuning sockets of a computing environment. The method includes, for instance, dynamically determining information relating to a current configuration of the computing environment; and setting one or more parameters of a socket of the computing environment based on the dynamically determined information.

In a further embodiment, a method of tuning sockets of a computing environment is provided. The method includes, for instance, determining, in response to opening a socket of the computing environment, information relating to a current configuration of the computing environment, the information including at least one of information relating to a network of the computing environment coupled to the socket and information relating to the socket; and setting one or more parameters of the socket based on the determined information, wherein the one or more parameters reflect the current configuration of the computing environment.

System and computer program products corresponding to the above-summarized methods are also described and claimed herein.

Advantageously, the capabilities of the present invention enable the tuning of system resources in changing environments. For example, socket parameters are dynamically set based on the current configuration of the environment (e.g., based on the current number of socket connections and/or the network type). This tuning is performed without stopping the system and with no need for static allocations.

In one example, the capabilities of the present invention provide optimized values to the Transmission Control Protocol (TCP)/Internet Protocol (IP) socket that utilizes the advertised window feature of TCP/IP to prevent exhaustion of system network resources and poor performance.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1a depicts one embodiment of a computing environment incorporating and using aspects of the present invention;

BEST MODE FOR CARRYING OUT THE INVENTION

Figure 1B:
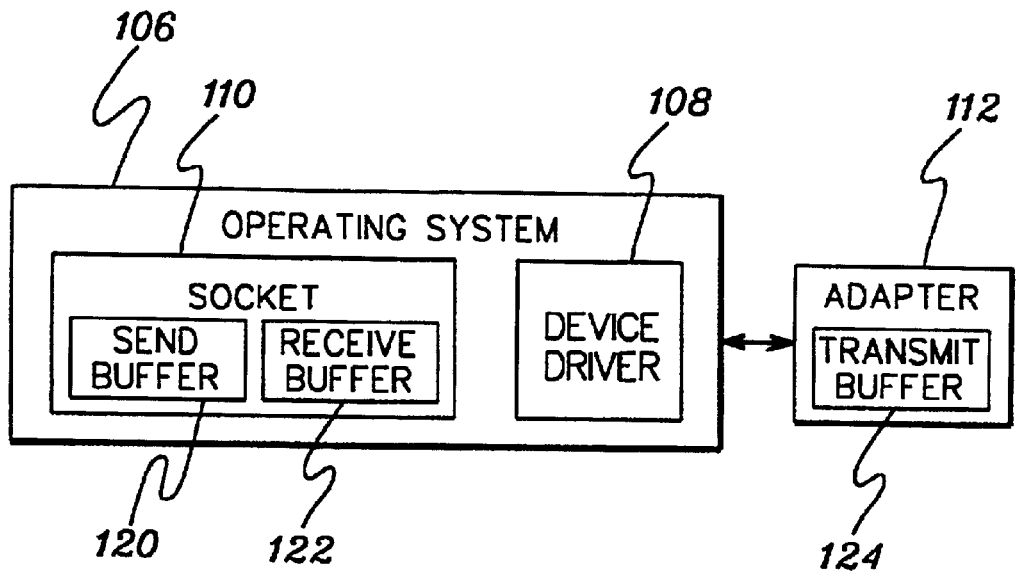
FIG. 1b depicts one example of various buffers of the computing environment of FIG. 1a, one or more of which are tuned in accordance with an aspect of the present invention.

In accordance with an aspect of the present invention, sockets are dynamically optimized for indeterminate environments. For example, sockets are optimized for changing environments (i.e., varying number of socket connections and/or different network types). To dynamically optimize a particular socket, application specific information available at the time the socket is opened and/or information available from the socket itself is utilized. This information is used to determine the optimal socket tuning needed for efficient internet protocol (IP) traffic between the node initializing the socket and the node at the other end (i.e., the remote node) of the socket connection.

One embodiment of a computing environment incorporating and using aspects of the present invention is described with reference to FIG. 1a. A computing environment 100 includes, for instance, a plurality of nodes 102 coupled to one another via one or more networks 104. Although two nodes and one network are illustrated, it is well known that a computing environment can include many more nodes and networks. For example, a particular node can be coupled to one or more other nodes via one network type, and further coupled to one or more other nodes via another network type, etc.

A node 102 includes an operating system 106, such as AIX. Operating system 106 includes, for instance, at least one device driver 108 and at least one socket 110, such as a TCP/IP socket. The number of device drivers is based, for instance, on the number of adapters in the environment; and the number of sockets is based, for example, on the desired number of socket connections between the node and one or more other remote nodes.

Coupled to operating system 106 are one or more network adapters 112. Each network adapter is used to couple its associated node to a particular network, which corresponds to that adapter type. Network 104 includes any IP capable network, such as the Ethernet, Token Ring, FDDI, ATM, SP Switch, Fiber Channel, etc.

Further details regarding socket 110 and adapter 112 are described with reference to FIG. 1b. In one embodiment, socket 110 includes at least one send buffer 120 used to send data from the socket, and at least one receive buffer 122 used to receive data at the socket. Additionally, adapter 112 includes, for instance, at least one transmit buffer 124 used to transmit data across the network.

The buffers are used to communicate between the nodes. For efficient communication, however, various of the buffers are tuned appropriately. For-example, the send and receive buffers of a socket are tuned. This tuning includes, for instance, establishing optimal settings for the parameters of the socket buffers (i.e., socket parameters), even though the environment includes an indeterminate number of socket connections and/or unknown network types. That is, optimal settings are determined even though the environment is changing.

Figure 2:
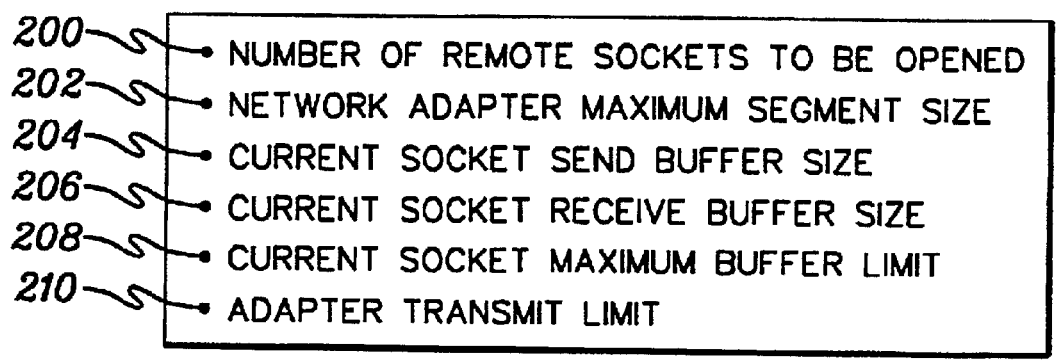
FIG. 2 depicts one example of information used by one aspect of the present invention to tune one or more of the socket buffers of FIG. 1b.

The setting of the socket parameters utilizes certain information that is dynamically determined, when for instance, the node opens the socket. This information is available from the application opening the socket and/or from the socket itself. One example of the information used in tuning the parameters is described with reference to FIG. 2.

In one embodiment, the information includes, for instance:

(a) The number of remote sockets 200 to be opened. This information is available from the application requesting the socket connection (i.e., on the home node). This application determines at socket open time the total number of remote sockets.

The following information, which is extracted by the node opening the socket, is extracted from the opened socket itself:

(b) A network adapter maximum segment size 202, which indicates the size of the largest message that can be sent for the particular network being used. In TCP/IP, this information is retrieved as the TCP_MAXSEG option from the IPPROTO_TCP level;

(c) A current socket send buffer size 204, which indicates how much data the socket is going to attempt to send. In TCP/IP, this information is retrieved as the SO_SNDBUF option from the SOL_SOCKET level;

(d) A current socket receive buffer size 206, which indicates how much data the socket can receive. In TCP/IP, this information is retrieved as the SO_RCVBUF option from the SOL_SOCKET level;

(e) A current socket maximum buffer limit (sb_max), which indicates the maximum amount of buffer space that a single socket could obtain to stage data. It is retrieved, for instance, from the sb_max field of the socket parameter structures; and (f) An adapter transmit limit 210, which indicates either the maximum number of packets or the maximum amount of data that an adapter can handle at any one time. It is obtained using, for instance, ioctl for the adapter.

Some or all of the information listed above is used to set one or more parameters associated with the socket. For instance, the information, which is based on the current configuration of the computing environment, is used to set the current socket send buffer size and/or the current socket receive buffer size.

These parameters are set on the node initiating the socket connection (i.e., the home node), as well as on the node at the other end of the connection (i.e., the remote node). One embodiment of the logic associated with performing the tuning by the home node is described with reference to FIG. 3. As one example, the logic runs in an application of the home node and is run at the time of opening the socket.

Figure 3:
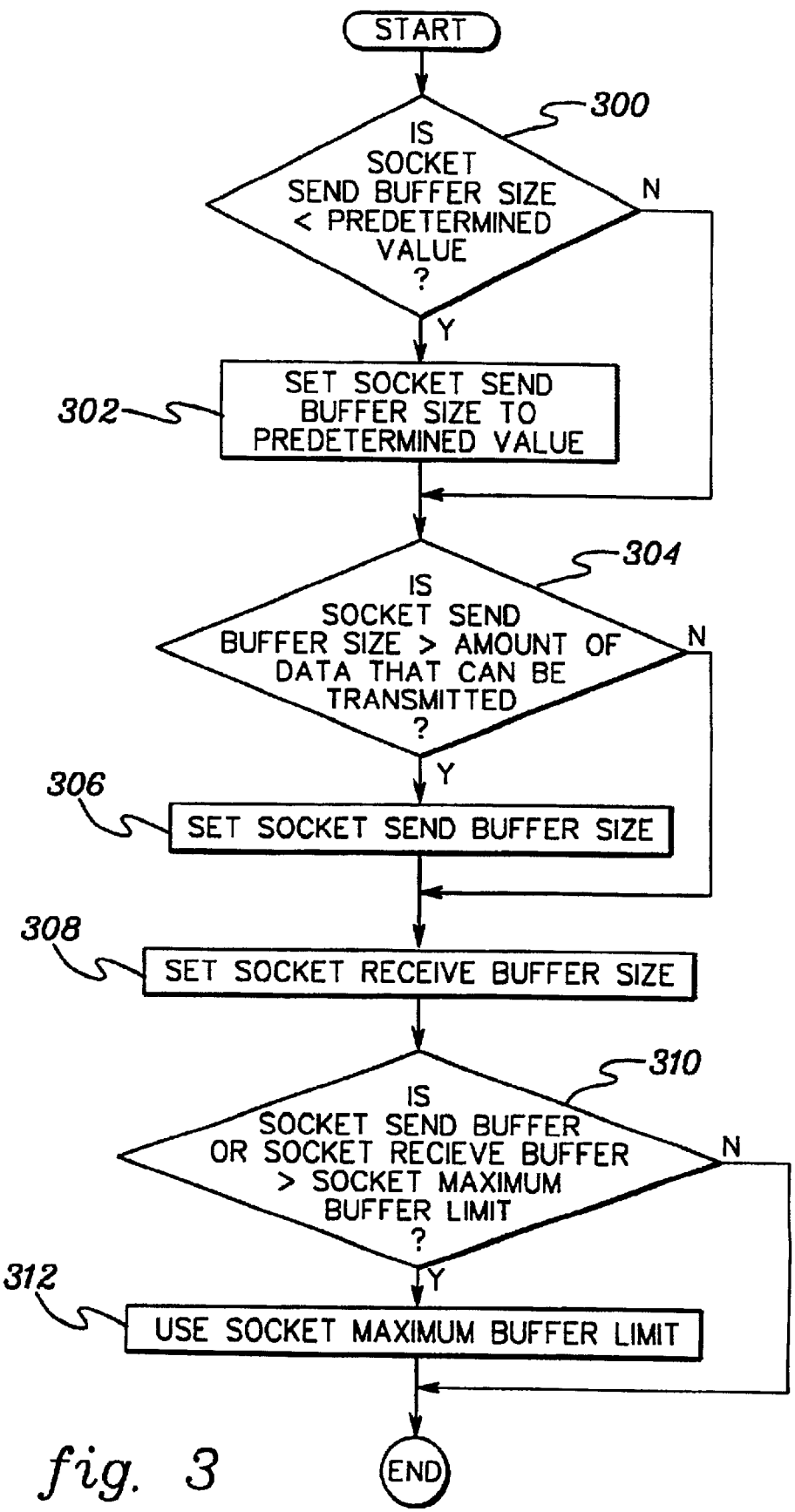
FIG. 3 depicts one embodiment of the logic used by a home node to tune one or more of its socket buffers, in accordance with an aspect of the present invention.

Referring to FIG. 3, initially, a determination is made as to whether the current socket send buffer size (SO_SNDBUF) is less than a predetermined value, INQUIRY 300. In one example, this predetermined value is equal to four times the network adapter maximum segment size (TCP_MAXSEG). If the retrieved SO_SNDBUF value is less than four times TCP_MAXSEG, then the SO_SNDBUF is set equal to the predetermined value, STEP 302. That is, in this example, SO_SNDBUF is set equal to four times TCP_MAXSEG. This is to ensure minimal data streaming from the socket.

Subsequently, or if the socket send buffer size is not less than the predetermined value, a further determination is made as to whether the socket send buffer size is greater than the amount of data that can be transmitted, INQUIRY 304. For instance, a determination is made as to whether the retrieved SO_SNDBUF value is greater than the maximum number of packets in the adapter transmit queue times TCP_MAXSEG, or greater than the adapter transmit buffer size, depending on how the data is being transmitted (e.g., packets or buffers).

Should the socket send buffer size be greater than the amount of data that can be transmitted, then SO_SNDBUF is set to the maximum number of packets in the adapter transmit buffer times TCP_MAXSEG or it is set to the maximum adapter buffer size to prevent sending more data than the network adapter can handle, STEP 306.

Thereafter, or if the send buffer value is not greater than the amount of data that can be transmitted, the socket receive buffer size is set, STEP 308. In one example, the socket receive buffer size (SO_RCVBUF) is set to a large size (e.g., 512 k) so that each socket can have a reasonable receive buffer to receive the data.

Subsequent to setting the socket receive buffer size, a further determination is made as to whether the socket send buffer size or the socket receive buffer size is greater than the current socket maximum buffer limit (sb_max), INQUIRY 310. Should the socket send buffer size (SO_SNDBUF) or socket receive buffer size (SO_RCVBUF) exceed sb_max, then the socket maximum buffer limit is used for whichever buffer size is in excess to prevent a system error message indicating a socket is exceeding the socket maximum buffer limit, STEP 312. This completes the tuning of the send and receive buffers on the home node.

In addition to tuning the send and receive buffers of the socket on the home node, the send and receive buffers of the socket at the remote node are also tuned. One embodiment of the logic associated with this tuning is described with reference to FIG. 4. As one example, the logic runs in an application of the remote node and is run at the time of opening the socket.

Figure 4:
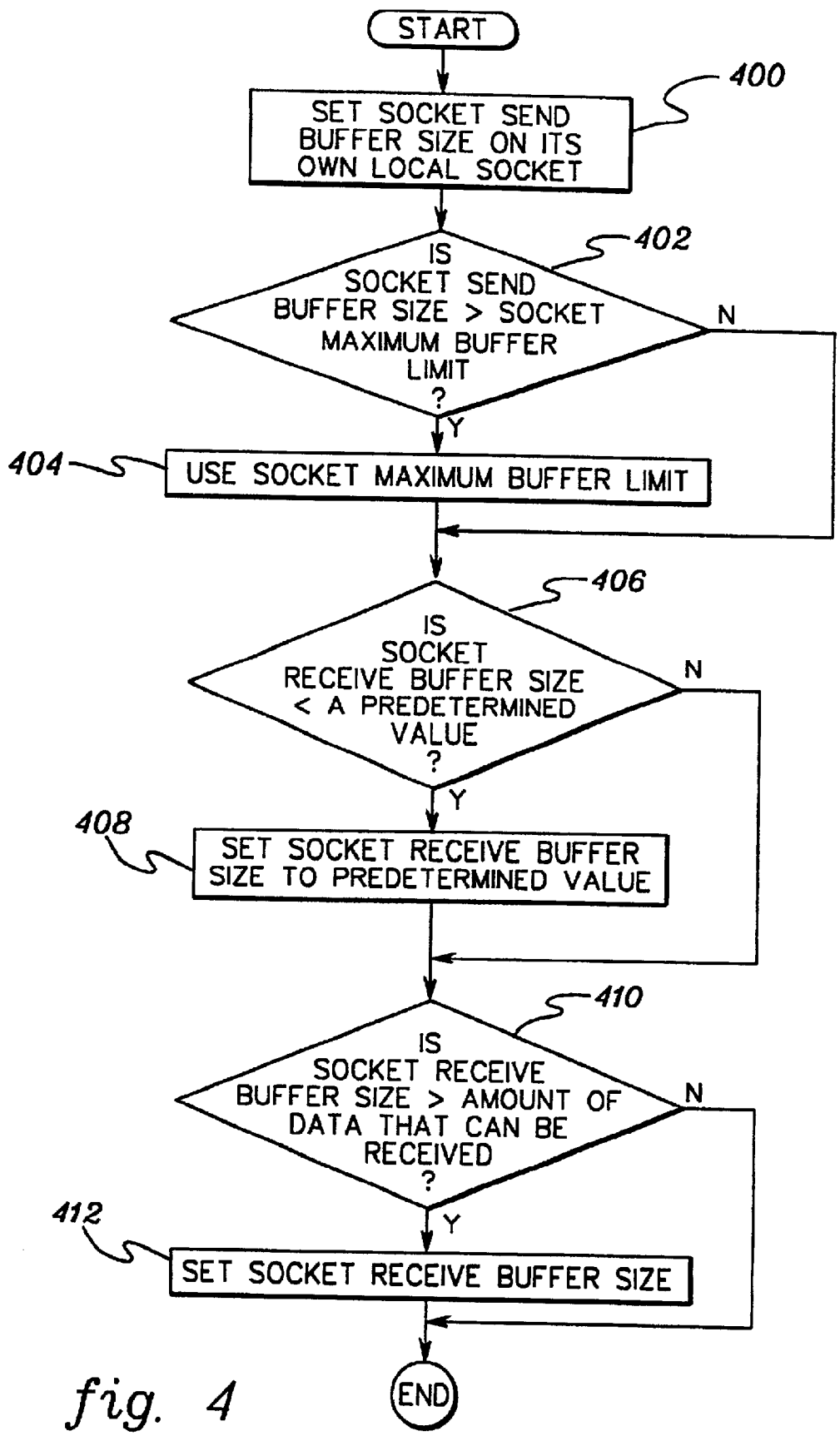
FIG. 4 depicts one embodiment of the logic used by a remote node to tune one or more of its socket buffers, in accordance with an aspect of the present invention.

Referring to FIG. 4, initially, the remote node receives from the home node the number of remote sockets to be opened. Then, based on the number of remote sockets to be opened, the current socket send buffer size is set on the remote node using a predefined equation, STEP 400. In one example, the predefined equation includes: (maximum number of packets per adapter of the adapter transmit limit (or maximum buffer of adapter transmit limit÷TCP_MAXSEG)÷number of remote sockets to be opened (or four if less than four))×TCP_MAXSEG. This equation is used to determine a maximum amount of data that can be sent by the socket based on the current configuration.

Thereafter, a determination is made as to whether the socket send buffer size derived from the above equation is greater than the socket maximum buffer limit (sb_max), INQUIRY 402. If so, then sb_max is used for the socket send buffer size, instead of the derived socket send buffer size, STEP 404.

Next, or if the socket send buffer size is not greater than sb_max, then a further determination is made as to whether the socket receive buffer size is less than a predetermined value, INQUIRY 406. In one example, this predetermined value is equal to four times the network adapter maximum segment size (TCP_MAXSEG). If the socket receive buffer value is less than four times TCP_MAXSEG, then SO_RCVBUF is set equal to the predetermined value, STEP 408. This is to ensure minimal data streaming from the TCP/IP socket.

Subsequently, or if the socket receive buffer size is not less than the predetermined value, then a further determination is made as to the whether the socket receive buffer size is greater than the amount of data that the adapter can receive, INQUIRY 410. Should the socket receive buffer size be greater than the amount of data that the adapter can receive, then the socket receive buffer size is set, STEP 412. In one embodiment, it is set equal to the (maximum number of packets per adapter of the adapter transmit limit (or maximum buffer of the adapter transmit limit divided by TCP_MAXSEG) divided by the number of remote TCP/IP sockets to be opened (or four if less than four))×TCP_MAXSEG.

Described in detail above is a capability for optimally tuning a socket. The capability utilizes application specific data and/or information about the socket connection available from the socket to set one or more parameters of the socket. Each socket is optimized, so that the amount of data sent by one or more sockets of a particular network does not exceed the capabilities of the network adapters.

For the home node sending out data, the tuning parameters ensure that a minimal number of IP packets will be sent per socket, thus providing some level of data streaming. Further, it ensures that the number of packets will not exceed the adapters ability for handling packets. The remote node ensures that enough space is allocated, so that it can receive the full amount of data that the home node can send.

For the remote node, each connection is provided a portion of the total amount of space that the home node can receive. This prevents the remote nodes from flooding the home node with more data than it can handle. This uses the advertised windowing ability of TCP/IP across the remote connections to limit the amount of data sent per TCP/IP socket.

Advantageously, if there are multiple types of networks available, the capability of the present invention automatically adjusts the buffer allocations based on the segment size of the network selected per socket connection. If several parallel or cluster jobs are run at different numbers of sockets, then the technique adjusts the allocations of the buffers to optimize to the number of sockets. This is especially advantageous in cluster environments where the number of sockets and/or number of nodes available can be dynamic, which has to be accounted for each time a job is started.

Although aspects of the invention are described with reference to TCP/IP, the invention is not limited to such an environment. For example, the techniques can be applied to any implementation of IP, including, but not limited to, UDP/IP.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of tuning sockets of a clustered computing environment, said method comprising:
obtaining, by an application of the clustered computing environment, a value indicating a number of remote sockets to be opened;
dynamically determining information relating to a current configuration of the clustered computing environment; and
setting one or more parameters of a socket of said clustered computing environment based on the dynamically determined information and the obtained value.

2. The method of claim 1, wherein said dynamically determining is performed in response to opening the socket.

3. The method of claim 1, wherein said one or more parameters comprise a size of a send buffer of the socket.

4. The method of claim 1, wherein said one or more parameters comprise a size of a receive buffer of the socket.

5. The method of claim 1, wherein said dynamically determining comprises determining a maximum amount of data that can be sent by said socket based on the current configuration.

6. The method of claim 1, wherein said information comprises information relating to a network of the clustered computing environment coupled to the socket.

7. The method of claim 6, wherein said information relating to the network comprises at least one of a network adapter maximum segment size and an adapter transmit limit.

8. The method of claim 1, wherein said information comprises information relating to the socket.

9. The method of claim 8, wherein said information comprises at least one of a current socket send buffer size, a current socket receive buffer size and a current socket maximum buffer limit.

10. The method of claim 1, wherein said clustered computing environment includes an indeterminate number of sockets.

11. The method of claim 1, wherein said clustered computing environment includes one or more networks.

12. The method of claim 1, wherein said setting is performed by a node of the clustered computing environment initiating a socket connection with another node of the clustered computing environment, and wherein the socket is local to the initiating node.

13. The method of claim 12, said setting comprises setting a size of a send buffer of the socket based on at least one of a desired amount of data streaming through the send buffer, an amount of data that can be transmitted, and a maximum buffer limit of the socket.

14. The method of claim 12, wherein said setting comprises setting a size of a receive buffer of the socket, such that the size does not exceed a maximum buffer limit of the socket.

15. The method of claim 1, wherein said setting is performed by one node of the clustered computing environment being connected to by another node initiating a socket connection with the one node, and wherein the socket is local to the one node.

16. The method of claim 15, wherein said setting comprises setting a size of a send buffer of the socket based on the number of remote sockets to be opened.

17. The method of claim 15, wherein said setting comprises setting a size of a send buffer of the socket based on a maximum buffer limit of the socket.

18. The method of claim 15, wherein said setting comprises setting a size of a receive buffer of the socket based on an amount of data that can be received.

19. A method of tuning sockets of a clustered computing environment, said method comprising:
  obtaining, by an application of the clustered computing environment, a value indicating a number of remote sockets to be opened;
  determining, in response to opening a socket of the clustered computing environment, information relating to a current configuration of the clustered computing environment, said information including at least one of information relating to a network of the clustered computing environment coupled to the socket and information relating to the socket; and
  setting one or more parameters of the socket based on the determined information and the obtained value, wherein the one or more parameters reflect the current configuration of the clustered computing environment.

20. A system of tuning sockets of a clustered computing environment, said system comprising:
  means for obtaining, by an application of the clustered computing environment, a value indicating a number of remote sockets to be opened;
  means for dynamically determining information relating to a current configuration of the clustered computing environment; and
  means for setting one or more parameters of a socket of said clustered computing environment based on the dynamically determined information and the obtained value.

21. The system of claim 20, wherein the dynamically determining is performed in response to opening the socket.

22. The system of claim 20, wherein said one or more parameters comprise a size of a send buffer of the socket.

23. The system of claim 20, wherein said one or more parameters comprise a size of a receive buffer of the socket.

24. The system of claim 20, wherein said means for dynamically determining comprises means for determining a maximum amount of data that can be sent by said socket based on the current configuration.

25. The system of claim 20, wherein said information comprises information relating to a network of the clustered computing environment coupled to the socket.

26. The system of claim 25, wherein said information relating to the network comprises at least one of a network adapter maximum segment size and an adapter transmit limit.

27. The system of claim 20, wherein said information comprises information relating to the socket.

28. The system of claim 27, wherein said information comprises at least one of a current socket send buffer size, a current socket receive buffer size and a current socket maximum buffer limit.

29. The system of claim 20, wherein said clustered computing environment includes an indeterminate number of sockets.

30. The system of claim 20, wherein said clustered computing environment includes one or more networks.

31. The system of claim 20, wherein said means for setting comprises performing the setting by a node of the clustered computing environment initiating a socket connection with another node of the clustered computing environment, and wherein the socket is local to the initiating node.

32. The system of claim 31, wherein said means for setting comprises means for setting a size of a send buffer of the socket based on at least one of a desired amount of data streaming through the send buffer, an amount of data that can be transmitted, and a maximum buffer limit of the socket.

33. The system of claim 31, wherein said means for setting comprises means for setting a size of a receive buffer of the socket, such that the size does not exceed a maximum buffer limit of the socket.

34. The system of claim 20, wherein said means for setting comprises performing the setting by a node of the clustered computing environment being connected to by another node initiating a socket connection with the node, and wherein the socket is local to the node.

35. The system of claim 34, wherein said means for setting comprises means for setting a size of a send buffer of the socket based on the number of remote sockets to be opened.

36. The system of claim 34, wherein said means for setting comprises means for setting a size of a send buffer of the socket based on a maximum buffer limit of the socket.

37. The system of claim 34, wherein said means for setting comprises means for setting a size of a receive buffer of the socket based on an amount of data that can be received.

38. A system of tuning sockets of a clustered computing environment, said system comprising:
  means for obtaining, by an application of the clustered computing environment, a value indicating a number of remote sockets to be opened;
  means for determining, in response to opening a socket of the clustered computing environment, information relating to a current configuration of the clustered computing environment, said information including at least one of information relating to a network of the clustered computing environment coupled to the socket and information relating to the socket; and
  means for setting one or more parameters of the socket based on the determined information and the obtained value, wherein the one or more parameters reflect the current configuration of the clustered computing environment.

39. A system of tuning sockets of a clustered computing environment, said system comprising:
- an application of the clustered computing environment to obtain a value indicating a number of remote sockets to be opened;
- at least one node to dynamically determine information relating to a current configuration of the clustered computing environment; and
- one or more nodes of the at least one node to set one or more parameters of a socket of said clustered computing environment based on the dynamically determined information and the obtained value.

40. A system of tuning sockets of a clustered computing environment, said system comprising:
- an application of the clustered computing environment to obtain a value indicating a number of remote sockets to be opened;
- at least one node to determine, in response to opening a socket of the clustered computing environment, information relating to a current configuration of the clustered computing environment, said information including at least one of information relating to a network of the clustered computing environment coupled to the socket and information relating to the socket; and
- one or more nodes of the at least one node to set one or more parameters of the socket based on the determined information and the obtained value, wherein the one or more parameters reflect the current configuration of the clustered computing environment.

41. At least one program storage device readable by a machine, tangibly embodying at least one program of instructions executable by the machine to perform a method of tuning sockets of a clustered computing environment, said method comprising:
- obtaining, by an application of the clustered computing environment, a value indicating a number of remote sockets to be opened;
- dynamically determining information relating to a current configuration of the clustered computing environment; and
- setting one or more parameters of a socket of said clustered computing environment based on the dynamically determined information and the obtained value.

42. The at least one program storage device of claim 41, wherein said dynamically determining is performed in response to opening the socket.

43. The at least one program storage device of claim 41, wherein said one or more parameters comprise a size of a send buffer of the socket.

44. The at least one program storage device of claim 41, wherein said one or more parameters comprise a size of a receive buffer of the socket.

45. The at least one program storage device of claim 41, wherein said dynamically determining comprises determining a maximum amount of data that can be sent by said socket based on the current configuration.

46. The at least one program storage device of claim 41, wherein said information comprises information relating to a network of the clustered computing environment coupled to the socket.

47. The at least one program storage device of claim 46, wherein said information relating to the network comprises at least one of a network adapter maximum segment size and an adapter transmit limit.

48. The at least one program storage device of claim 41, wherein said information comprises information relating to the socket.

49. The at least one program storage device of claim 48, wherein said information comprises at least one of a current socket send buffer size, a current socket receive buffer size and a current socket maximum buffer limit.

50. The at least one program storage device of claim 41, wherein said clustered computing environment includes an indeterminate number of sockets.

51. The at least one program storage device of claim 41, wherein said clustered computing environment includes one or more networks.

52. The at least one program storage device of claim 41, wherein said setting is performed by a node of the clustered computing environment initiating a socket connection with another node of the clustered computing environment, and wherein the socket is local to the initiating node.

53. The at least one program storage device of claim 52, wherein said setting comprises setting a size of a send buffer of the socket based on at least one of a desired amount of data streaming through the send buffer, an amount of data that can be transmitted, and a maximum buffer limit of the socket.

54. The at least one program storage device of claim 52, wherein said setting comprises setting a size of a receive buffer of the socket, such that the size does not exceed a maximum buffer limit of the socket.

55. The at least one program storage device of claim 41, wherein said setting is performed by one node of the computing environment being connected to by another node initiating a socket connection with the node, and wherein the socket is local to the one node.

56. The at least one program storage device of claim 55, wherein said setting comprises setting a size of a send buffer of the socket based on the number of remote sockets to be opened.

57. The at least one program storage device of claim 55, wherein said setting comprises setting a size of a send buffer of the socket based on a maximum buffer limit of the socket.

58. The at least one program storage device of claim 55, wherein said setting comprises setting a size of a receive buffer of the socket based on an amount of data that can be received.

59. At least one program storage device readable by a machine, tangibly embodying at least one program of instructions executable by the machine to perform a method of tuning sockets of a clustered computing environment, said method comprising:
- obtaining, by an application of the clustered computing environment, a value indicating a number of remote sockets to be opened;
- determining, in response to opening a socket of the clustered computing environment, information relating to a current configuration of the clustered computing environment, said information including at least one of information relating to a network of the clustered computing environment coupled to the socket and information relating to the socket; and
- setting one or more parameters of the socket based on the determined information and the obtained value, wherein the one or more parameters reflect the current configuration of the clustered computing environment.

* * * * *